United States Patent
Taylor et al.

(10) Patent No.: US 9,563,632 B2
(45) Date of Patent: Feb. 7, 2017

(54) GARBAGE COLLECTION AWARE DEDUPLICATION

(75) Inventors: Mark Taylor, San Jose, CA (US); Goutham Rao, Los Altos, CA (US); Vinod Jayaraman, San Francisco, CA (US)

(73) Assignee: Dell Products L.P., Round Rock, TX (US)

(*) Notice: Subject to any disclaimer, the term of this patent is extended or adjusted under 35 U.S.C. 154(b) by 1022 days.

(21) Appl. No.: 13/555,534

(22) Filed: Jul. 23, 2012

(65) Prior Publication Data

US 2014/0025644 A1   Jan. 23, 2014

(51) Int. Cl.
   *G06F 17/30* (2006.01)
(52) U.S. Cl.
   CPC .............. *G06F 17/30129* (2013.01)
(58) Field of Classification Search
   CPC combination set(s) only.
   See application file for complete search history.

(56) References Cited

U.S. PATENT DOCUMENTS

| | | | |
|---|---|---|---|
| 7,742,617 B2* | 6/2010 | Smith et al. | 382/100 |
| 7,822,939 B1* | 10/2010 | Veprinsky et al. | 711/170 |
| 8,423,731 B1* | 4/2013 | Nadathur et al. | 711/162 |
| 8,527,544 B1* | 9/2013 | Colgrove et al. | 707/791 |
| 2005/0273698 A1* | 12/2005 | Smith et al. | 715/511 |
| 2010/0088284 A1* | 4/2010 | Cina | 707/665 |
| 2010/0313045 A1* | 12/2010 | Olarig et al. | 713/320 |
| 2011/0093439 A1* | 4/2011 | Guo et al. | 707/679 |
| 2011/0125719 A1* | 5/2011 | Jayaraman | 707/692 |
| 2013/0275391 A1* | 10/2013 | Batwara et al. | 707/689 |

\* cited by examiner

*Primary Examiner* — Mariela Reyes
*Assistant Examiner* — Sabana S Rahman
(74) *Attorney, Agent, or Firm* — Kwan & Olynick LLP

(57) ABSTRACT

Mechanisms are provided for improving the efficiency of garbage collection in a deduplication system by intelligently managing storage of deduplication segments. When a duplicate segment is identified, a reference count for an already maintained segment is incremented only if the already maintained segment has the same lifecycle as the identified duplicate segment. In some instances, an already maintained segment is assumed to have the same lifecycle if it is not stale or the age is not significantly different from the age of the newly identified duplicate. If the already maintained segment is has a different lifecycle, the new segment is stored again even though duplicates are already maintained.

16 Claims, 6 Drawing Sheets

Figure 1

Datastore Suitcase 101

Segment A 103
Reference Count 3

Segment B 105
Reference Count 1

Segment C 107
Reference Count 5

Segment D 109
Reference Count 3

Figure 2

```
Datastore Suitcase 201

Segment A 203
    Reference Count 3

Segment C 207
    Reference Count 5

Segment D 209
    Reference Count 3
```

Figure 4

| Dictionary 401 ||
|---|---|
| Fingerprint 411 | Storage Location 421 |
| a | Location 423 |
| b | Location 425 |
| c | Location 427 |

| Dictionary 451 ||
|---|---|
| Fingerprint 461 | Storage Location 471 |
| i | Location 473 |
| j | Location 475 |
| k | Location 477 |

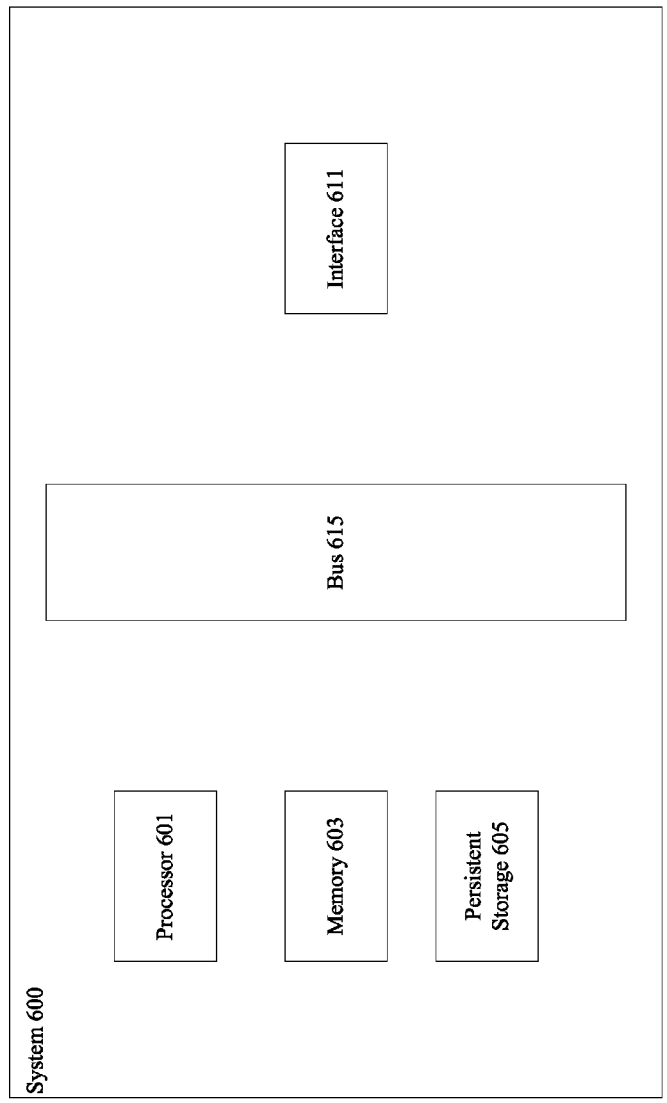

GARBAGE COLLECTION AWARE DEDUPLICATION

TECHNICAL FIELD

The present disclosure relates to garbage collection aware deduplication.

DESCRIPTION OF RELATED ART

Maintaining vast amounts of data is resource intensive not just in terms of the physical hardware costs but also in terms of system administration and infrastructure costs. Mechanisms for reducing resource usage include compression and deduplication. Compression involves encoding bit sequences using a reduced number of bits. Some file formats themselves are already compressed, while other file formats can be compressed using a variety of available utilities.

Data deduplication refers to the ability of a system to eliminate data duplication across files to increase storage, transmission, and/or processing efficiency. A storage system which incorporates deduplication technology involves storing a reduced number of instances of data segments that are common across multiple files. In some examples, data sent to a storage system is segmented as a full file, in fixed size segments, or in variable size segments.

Data structures such as datastore suitcases are configured to hold individual segments mapped to data blocks in multiple files. These data structure are efficient and represent more logical data with less physical space. However, issues arise when logical contents such as files are deleted. Segments in a datastore suitcase can not immediately be deleted because they may be referenced by other files. A delete of a file does not immediately translate into the delete of the actual blocks. Instead, reference counts for shared segments need to be decremented. When a segment is no longer referenced by any file, e.g. the reference count reaches 0, the segment can be deleted and reclaimed.

However, mechanisms for efficiently handling deletion of actual data in a deduplication system are limited. In many instances, a deduplication file system can be significantly fragmented. Garbage collection processes can be very burdensome and resource intensive. Consequently, techniques and mechanisms are provided to improve a deduplication system and associated processes to allow for more efficient garbage collection.

BRIEF DESCRIPTION OF THE DRAWINGS

The disclosure may best be understood by reference to the following description taken in conjunction with the accompanying drawings, which illustrate particular embodiments of the present invention.

FIG. 1 illustrates a particular example of a datastore suitcase.

FIG. 2 illustrates a particular example of fragmentation.

FIG. 4 illustrates a particular example of a deduplication dictionary.

FIG. 6 illustrates a particular example of a storage system.

DESCRIPTION OF PARTICULAR EMBODIMENTS

Figure 3:
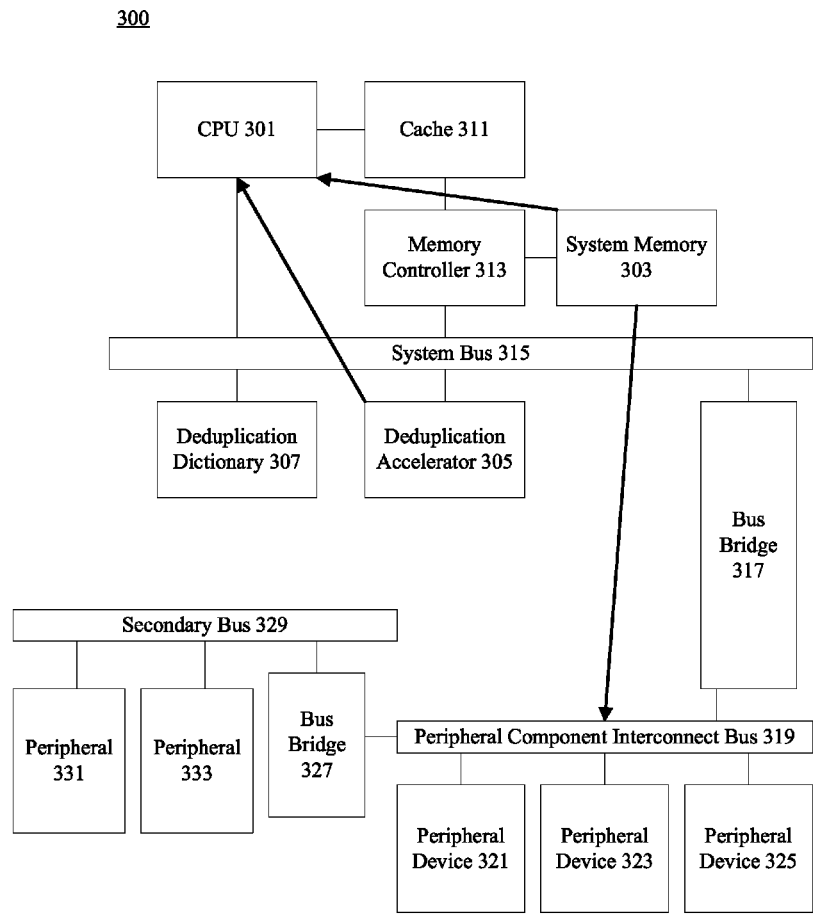
FIG. 3 illustrates a particular example of a system that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for improving the efficiency of garbage collection in a deduplication system by intelligently managing storage of deduplication segments. When a duplicate segment is identified, a reference count for an already maintained segment is incremented only if the already maintained, segment has the same lifecycle as the identified duplicate segment. In some instances, an already maintained segment is assumed to have the same lifecycle if it is not stale or the age is not significantly different from the age of the newly identified duplicate. If the already maintained segment is has a different lifecycle, the new segment is stored again even though duplicates are already maintained.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers and reduce the associated network traffic. A variety of utilities compress files on an individual basis prior to writing data to file servers. Compression algorithms are well developed and widely available. Some compression algorithms target specific types of data or specific types of files. Compression algorithms operate in a variety of manners, but many compression algorithms analyze data to determine source sequences in data that can be encoded using shorter code words. In many implementations, the most frequent source sequences or the most frequent long source sequences are replaced with the shortest possible code words.

Data deduplication reduces storage footprints by reducing the amount of redundant data. Deduplication may involve identifying full file, fixed size, or variable size segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, a deduplication system searches for matching sequences using a sliding window and uses references to identify matching sequences instead of storing the matching sequences again.

In a data deduplication system, the backup server working in conjunction with a backup agent identifies candidate files for backup, creates a backup stream and sends the data to the deduplication system. A typical target system in a deduplication system will deduplicate data as data segments are received. A block that has a duplicate already stored on the deduplication system will not need to be stored again. However, other information such as references and reference counts may need to be updated. Some implementations allow the candidate data to be directly moved to the deduplication system without using backup software by exposing a network attached storage (NAS) drive that a user can manipulate to backup and archive files.

Data structures such as datastore suitcases are configured to support a many to many mapping of segments to various files. For example, multiple files may reference the same segment maintained in a datastore suitcase. The data structures represent more logical data with less physical space. However, issues arise when logical contents are deleted. Because a segment may be shared by multiple files, a delete of one file referencing the segment does not immediately translate into a delete of the segment itself. According to various embodiments, segments have reference counts that indicate how many files currently reference the segment. When a reference count reaches zero or a value indicating that no files currently reference the segment, the segment in the datastore suitcase can then be deleted.

Over time, many data structure have a significant number of unreferenced segments corresponding to internal fragmentation. In order to address the internal fragmentation, deduplication file systems typically use a garbage collection mechanism to recompact the data structures such as datastore suitcases to avoid fragmentation and reclaim lost space. However, recompaction is typically input/output (I/O) intensive and inefficient. In many instances, recompaction is impractical and not used.

Another option for reducing internal fragmentation is to use smaller size datastore suitcases. However, when a deduplication engine is optimizing an incoming data stream, it is more efficient for the deduplication engine to work on as much data as possible in memory, and then write segments to disk in a continuous manner as opposed to writing many small segments. This avoids the inefficient random write accesses to disk arrays. However, writing segments to disk in a continuous manner results in larger data structures.

Consequently, techniques of the present invention recognize that garbage collection and associated delete operation efficiency can be improved by modifying the data storage process or data ingest process. According to various embodiments, incoming segments are not linked with stored segments that have different lifecycles even if the segments are duplicates.

Different prediction strategies can be used to determine when a segment will be deleted. According to various embodiments, if incoming data stream duplicate segments have a different lifecycle than already stored duplicate segments, a deduplication system will not bind these two segments even if they are identical. In particular embodiments, the deduplication system will not merely increase the reference count of the stored duplicate segment but would instead create a new segment in a new datastore suitcase.

According to various embodiments, a duplicate segment is declared only if the stored segment and new segment hashes are identical and the stored segment has the same lifecycle as the new segment. In some examples, a duplicate segment is declared if segment identifiers correspond and the stored segment is not significantly different in age from the identified duplicate segment. In other examples, a duplicate segment is declared if the identified duplicate segment is not stale or has not aged more than a week.

In particular embodiments, several deduplication system use cases can be analyzed into order to determine whether an already maintained segment has the same lifecycle as a newly identified duplicate. In many deduplication systems, many users create weekly full backups with daily incremental backups. These reside as files on a file system. Based on policy, users will predictably delete older backups. In other instances, users will fill the backup file system to close to maximum capacity and then scramble to delete older data.

In both cases, it is accurate to say that as time goes on, the distance in age between the content on a backup file system delete older data.

In both cases, the difference in age corresponds to a difference in similarity between content and there is less likely to be a duplicate. According to various embodiments, in order for an incoming segment to be determined to be a duplicate of another already maintained segment, the identifiers for the segments should correspond and the newly identified segment must be less than X days different in age from the already maintained segment, where X is calculated as follows:

$$X=7+(23-(\min(A,D)/A*23);\qquad\text{(Equation 1)}$$

where A is the number of bytes added weekly (calculated every week) and D is the number of bytes deleted weekly (calculated every week).

The reasoning is that it is desirable to have at least a week worth of content that can be deduplicated, and the window can extend to at most a month based on the ratio of adds and deletes in the system. It should be noted that Equation 1 is just one example of a heuristic, and a variety of equations can be used for particular deduplication systems.

For example, instead of basing the formula on time, it could be based on amount of data written. In this scenario a stream will only bind with data within the same data window.

FIG. 1 illustrates one example of a datastore suitcase. Although a variable size segment deduplication datastore suitcase is shown, it should be noted that various mechanisms of the present invention can be applied to a variety of other datastore suitcases and deduplication data structures. According to various embodiments, a datastore suitcase 101 maintains multiple deduplication segments. After a segment has been delineated, it is determined if the segment is already in a datastore suitcase. If it is not, the segment is added to a deduplication dictionary and stored in available space in a datastore suitcase such as datastore suitcase 101. File maps or object maps may be maintained to indicate where segments in particular files are maintained.

According to various embodiments, datastore suitcase 101 maintains segment A 103, segment B 105, segment C 107, and segment D 109. Segment A 103, segment B 105, segment C 107, and segment D 109 are referenced by files 3 times, 1 time, 5 times, and 3 times respectively. Reference counts are adjusted as duplicate segments are added to or removed from a deduplication system.

According to various embodiments, if the only file referencing segment B 105 is deleted or altered in a way that segment B 105 is no longer needed, the reference count is decremented to 0 and segment B 105 can be deleted. However, since segment B 105 is only a part of a larger datastore suitcase 101, segment B 105 cannot easily be removed. In typical instances, datastore suitcase 101 has to be recompacted. For example, segments are read and rewritten so that the space previously used by segment B 105 can now be used by segment C 107 or segment D 109. However, recompaction is resource intensive and taxes the underlying file system. Recompaction often consumes a significant portion of processing resources in a deduplication system.

Consequently, various techniques are provided to improve the efficiency of garbage collection and/or recompaction in a deduplication system.

FIG. 2 illustrates one example of fragmentation. According to various embodiments, a datastore suitcase 201 maintains multiple deduplication segments. After a segment has been delineated, it is determined if the segment is already in a datastore suitcase. If it is not, the segment is added to a deduplication dictionary and stored in available space in a datastore suitcase such as datastore suitcase 201. File maps or object maps may be maintained to indicate where segments in particular files are maintained.

According to various embodiments, datastore suitcase 201 maintains segment A 203, segment B 205, segment C 207, and segment D 209. Segment A 203, segment B 205, segment C 207, and segment D 209 are referenced by files 3 times, 1 time, 5 times, and 3 times respectively. Reference counts are adjusted as duplicate segments are added to or removed from a deduplication system.

According to various embodiments, if the only file referencing segment B 205 is deleted or altered in a way that segment B 205 is no longer needed, the reference count is decremented to 0 and segment B 205 can be deleted. However, since segment B 205 is only a part of a larger datastore suitcase 201, segment B 205 cannot easily be removed. In some instances, another segment can be placed in the position previously occupied by Segment B 205. For example, Segment E can be placed in datastore suitcase 201. However, Segment E may not fully occupy the space previously used by segment B 205. Furthermore, newly identified duplicates may correspond with Segment C 207 or D 209, increasing reference counts corresponding to Segments C 207 or D 209, preventing deletion of Segments C 207 and D 209 and preventing the deletion of datastore suitcase 201.

Recompaction can allow space to be reclaimed. However, recompaction is resource intensive and taxes the underlying file system. Recompaction often consumes a significant portion of processing resources in a deduplication system. Consequently, the techniques of the present invention provide that newly identified segments are not used to increase reference counts of existing deduplicated segments unless the identifiers correspond and the newly identified segments have lifecycles that correspond to those of the existing reduplicated segments. In some examples, if a newly identified segment is similar in age to an already deduplicated segment, the newly identified segment need not be stored again and a reference count for the already deduplicated segment or the stored segment can be incremented. In another example, if the newly identified segment is from the same data stream as an already deduplicated segment, the newly identified segment need not be stored again and a reference count for the already deduplicated segment can be incremented. In still another example, if the newly identified segment meets the criteria outlined in Equation 1, a reference count can be incremented.

Consequently, various techniques are provided to improve the efficiency of garbage collection by modifying how data segments are deduplicated and maintained.

FIG. 3 illustrates a particular example of a system that can use the techniques and mechanisms of the present invention. According to various embodiments, data is received at an accelerated deduplication system 300 over an interface such as a network interface. A data stream may be received in segments or blocks and maintained in system memory 303. According to various embodiments, a processor or CPU 301 maintains a state machine but offloads boundary detection and fingerprinting to a deduplication engine or deduplication accelerator 305. The CPU 301 is associated with cache 311 and memory controller 313. According to various embodiments, cache 311 and memory controller 313 may be integrated onto the CPU 301.

In particular embodiments, the deduplication engine or deduplication accelerator 305 is connected to the CPU 301 over a system bus 315 and detects boundaries using an algorithm such as Rabin to delineate segments of data in system memory 303 and generates fingerprints using algorithms such as hashing algorithms like SHA-1 or MD-5. The deduplication engine 305 accesses the deduplication dictionary 307 to determine if a fingerprint is already included in the deduplication dictionary 307. According to various embodiments, the deduplication dictionary 307 is maintained in persistent storage and maps segment fingerprints to segment storage locations. In particular embodiments, segment storage locations are maintained in fixed size extents. Datastore suitcases, references, metadata, etc., may be created or modified based on the result of the dictionary lookup.

If the data needs to be transferred to persistent storage, the optimization software stack will communicate to the CPU 301 the final destination direct memory access (DMA) addresses for the data. The DMA addresses can then be used to transfer the data through one or more bus bridges 317 and/or 327 and secondary buses 319 and/or 329. An example of a secondary bus is a peripheral component interconnect (PCI) bus 319. Peripherals 321, 323, 325, 331, and 333 may be peripheral components and/or peripheral interfaces such as disk arrays, network interfaces, serial interfaces, timers, tape devices, etc.

FIG. 4 illustrates multiple dictionaries assigned to different fingerprints. According to various embodiments, the fingerprint values are checksums or SHA/SHA1/SHA-256 hash values. In particular embodiments, dictionary 401 is a deduplication dictionary used by a first node and includes fingerprint ranges from 0x0000 0000 0000 0000-0x0000 0000 FFFF FFFF. Dictionary 451 is used by a second node and includes fingerprint ranges from 0x0000 0001 0000 0000-0X0000 0001 FFFF FFFF. Fingerprints 411 within the range for dictionary 401 are represented by symbols a, b, and c for simplicity. Fingerprints 461 within the range for dictionary 451 are represented by symbols i, j, and k for simplicity. According to various embodiments, each fingerprint in dictionary 401 is mapped to a particular storage location 421 such as location 423, 425, or 427. Each fingerprint in dictionary 451 is mapped to a particular storage location 471 such as location 473, 475, and 477.

Having numerous small segments increases the likelihood that duplicates will be found. However, having numerous small segments decreases the efficiency of using the dictionary itself as well as the efficiency of using associated object maps and datastore suitcases.

Figure 5:
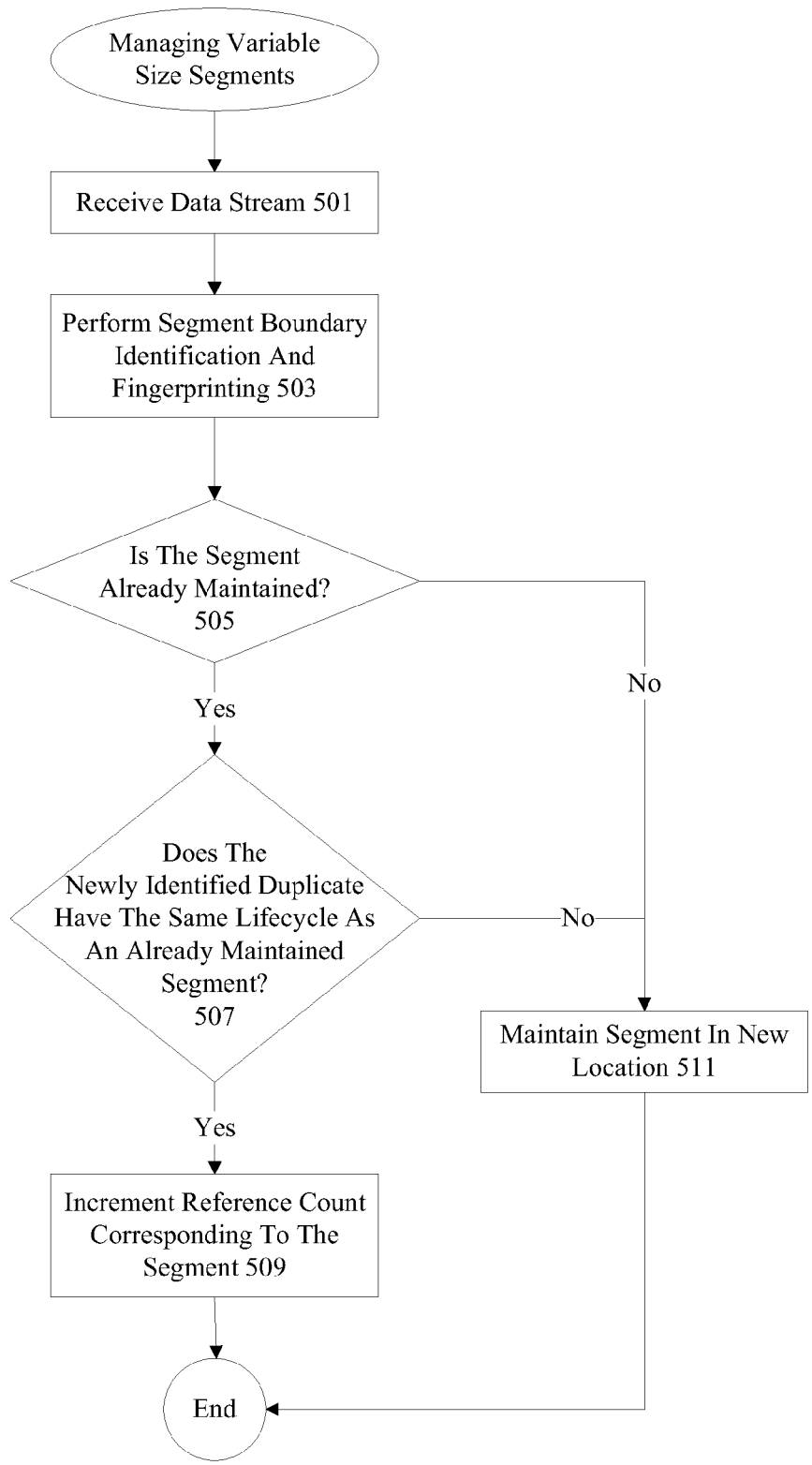
FIG. 5 illustrates a particular example of maintaining performing garbage collection aware deduplication.

FIG. 5 illustrates a particular example of a technique for performing deduplication in a garbage collection aware manner. According to various embodiments, a data stream is received at 501. The data stream may be a file, volume, or data block received in-line or post-process. That is, the data stream may be received while it is being transmitted for storage or may be received after data has already been stored. At 503, segment boundary identification and segment fingerprinting is performed to generate multiple variable size segments. In particular embodiments, boundaries are identified to increase the likelihood that duplicate segments will be detected. According to various embodiments, a deduplication dictionary is accessed at 505 to determine whether a particular segment is already maintained in a datastore suitcase and where the particular segment is located.

If the segment is already maintained at 505, it is then determined if the newly identified duplicate has the same lifecycle as the already maintained segment at 507. If the newly identified duplicate has the same lifecycle, a reference count corresponding to the segment is incremented at 509. If the segment is not already stored or the segment is a duplicate but does not have the same lifecycle as an already maintained segment, the segment is stored at a new location at 511. The segment is stored again even if an existing duplicate is already maintained in the system.

A variety of devices and applications can implement particular examples of the present invention. FIG. 6 illustrates one example of a system that can be used as a storage node in a duplication system. According to particular example embodiments, a system 600 suitable for implementing particular embodiments of the present invention includes a processor 601, a memory 603, an interface 611, persistent storage 605, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 605 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile PAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
   performing segment boundary identification and segment fingerprinting to delineate a plurality of segments including a first segment;
   accessing a deduplication dictionary to determine whether the first segment corresponds to a stored segment maintained in a datastore suitcase;
   determining whether the first segment has the same lifecycle as the stored segment; and
   adjusting a reference count associated with the stored segment in the datastore suitcase only if the first segment corresponds to the stored segment and the first segment has the same lifecycle as the stored segment,
   wherein the first segment has the same lifecycle as the stored segment if the first segment and the stored segment have ages that are not more than X days apart, wherein X is calculated using the number of bytes added and the number of bytes deleted in a given time period,
   wherein X is calculated as follows: $X=7+(23-(\min(A, D)/A*23)$,
   where A is the number of bytes added weekly (calculated every week) and D is the number of bytes deleted weekly (calculated every week).

2. The method of claim 1, wherein the plurality of segments are variable size segments.

3. The method of claim 1, wherein the first segment has the same lifecycle as the stored segment if the first segment and the stored segment are from the same data stream.

4. The method of claim 1, wherein the first segment has the same lifecycle as the stored segment if the first segment and the stored segment have ages that are not more than one week apart.

5. The method of claim 1, wherein the first segment has the same lifecycle as the stored segment if the stored segment is not stale.

6. The method of claim 1, wherein the first segment is deleted when the reference count indicates that the stored segment is no longer mapped to any file.

7. The method of claim 1, wherein adjusting the reference count comprises incremented the reference count.

8. The method of claim 1, wherein the first segment is stored again if the first segment has a different lifecycle than the stored segment even though the first segment is a duplicate of the stored segment.

9. A system comprising:
an interface operable to receive a plurality of delineated segments including a first segment;
a storage device, the storage device configured to maintain a deduplication dictionary for determining determine whether the first segment corresponds to a stored segment maintained in a datastore suitcase;
a processor, the processor configured to determine whether the first segment has the same lifecycle as the stored segment and adjust a reference count associated with the stored segment in the datastore suitcase only if the first segment corresponds to the stored segment and the first segment has the same lifecycle as the stored,
wherein the first segment has the same lifecycle as the stored segment if the first segment and the stored segment have ages that are not more than X days apart, wherein X is calculated using the number of bytes added and the number of bytes deleted in a given time period,
wherein X is calculated as follows: $X=7+(23-(min(A, D)/A*23)$,
where A is the number of bytes added weekly (calculated every week) and D is the number of bytes deleted weekly (calculated every week).

10. The system of claim 9, wherein the plurality of segments are variable size segments.

11. The system of claim 9, wherein the first segment has the same lifecycle as the stored segment if the first segment and the stored segment are from the same data stream.

12. The system of claim 9, wherein the first segment has the same lifecycle as the stored segment if the first segment and the stored segment have ages that are not more than one week apart.

13. The system of claim 9, wherein the first segment has the same lifecycle as the stored segment if the stored segment is not stale.

14. The system of claim 9, wherein the first segment is deleted when the reference count indicates that the stored segment is no longer mapped to any file.

15. The system of claim 9, wherein the first segment is stored again if the first segment has a different lifecycle than the stored segment even though the first segment is a duplicate of the stored segment.

16. A non-transitory computer readable medium comprising:
computer code for performing segment boundary identification and segment fingerprinting to delineate a plurality of segments including a first segment;
computer code for accessing a deduplication dictionary to determine whether the first segment corresponds to a stored segment maintained in a datastore suitcase;
computer code for determining whether the first segment has the same lifecycle as the stored segment; and
computer code for adjusting a reference count associated with the stored segment in the datastore suitcase only if the first segment corresponds to the stored segment and the first segment has the same lifecycle as the stored segment,
wherein the first segment has the same lifecycle as the stored segment if the first segment and the stored segment have ages that are not more than X days apart, wherein X is calculated using the number of bytes added and the number of bytes deleted in a given time period,
wherein X is calculated as follows: $X=7+(23-(min(A, D)/A*23)$,
where A is the number of bytes added weekly (calculated every week) and D is the number of bytes deleted weekly (calculated every week).

* * * * *